United States Patent [19]
Kawano et al.

[11] Patent Number: 5,533,585
[45] Date of Patent: Jul. 9, 1996

[54] DEVICE FOR ADJUSTING A DRIVING CHAIN IN A SNOWMOBILE

[75] Inventors: Shizuo Kawano; Tadaaki Nagata, both of Saitama, Japan

[73] Assignee: Honda Giken Kogyo Kabushiki Kaisha, Tokyo, Japan

[21] Appl. No.: 350,007

[22] Filed: Nov. 29, 1994

[30] Foreign Application Priority Data

Nov. 29, 1993 [JP] Japan .................................. 5-298408

[51] Int. Cl.⁶ .................................................. B62M 27/02
[52] U.S. Cl. ........................... 180/190; 180/9.64; 180/9.1
[58] Field of Search .................................. 180/182, 186, 180/190, 193, 9.1, 9.42, 9.62, 9.64; 474/113, 114, 116

[56] References Cited

U.S. PATENT DOCUMENTS 3,673,884  7/1972  Southiere ........................ 180/9.64 X
5,203,424  4/1993  Gogo et al. ........................... 180/190

FOREIGN PATENT DOCUMENTS 49-39124   6/1974  Japan .
2-88386    3/1990  Japan ..................................... 180/190
3-231090  10/1991  Japan ..................................... 180/190

Primary Examiner—Kevin T. Hurley
Attorney, Agent, or Firm—Birch, Stewart, Kolasch & Birch

[57] ABSTRACT

A chain of a driving device for a snowmobile can be adjusted by a simple operation. A gear case is provided with lever portions. One lever portion is mounted on a gear case pivot. The other lever portion is fastened with a bracket provided on an upper frame through a chain adjuster. The chain adjuster has a cam surface and has a rotational shaft held in a slit of the bracket. The chain adjuster is loosened and rotated through a predetermined angle. Then, the gear case rotates around the gear case pivot and the idle shaft moves whereby stretching of the chain can be finely adjusted.

20 Claims, 10 Drawing Sheets

DEVICE FOR ADJUSTING A DRIVING CHAIN IN A SNOWMOBILE

BACKGROUND OF THE INVENTION

1. Field of the Invention

The present invention relates to a driving device for a snowmobile which is run on the snow by a crawler belt.

2. Description of Background Art

As a driving system for a snowmobile, the driving system using a belt converter has been widely known, as disclosed in Japanese Utility Model Laid-Open No. 49-39124. That is, a driving force of the engine is transmitted to a drive pulley of a belt converter, the rotation of the drive pulley is transmitted to a driven pulley through a belt, and the rotation of the driven pulley is transmitted to a driving sprocket of a crawler belt through a chain.

In the system disclosed in the aforementioned Japanese Utility Model Laid-Open No. 49-39124, power is not effectively transmitted since a mechanism is not provided for adjusting a stretching of a chain, or a belt, for connecting the driven pulley with the driving sprocket.

It is contemplated that as a general procedure for adjusting the stretching of the chain, a slipper is used. However, where the slipper is used, the chain comes into contact with the slipper. Friction increases and wear is generated.

OBJECTS AND SUMMARY OF THE INVENTION

An object of the present invention is to adjust the stretching of the driving chain for the snowmobile without generating wear or the like. Therefore, the present invention provides a driving device for a snowmobile, in which an output of an engine is transmitted to an idle shaft through a belt converter and a chain is stretched between a sprocket secured to the idle shaft and a sprocket secured to a drive shaft of a crawler belt. The driving device is provided with an adjuster for adjusting in position the idle shaft around an axis within a region surrounded by a belt of the belt converter.

When the adjuster is rotated, a gear case which supports the idle shaft is rotated around an axis (gear case pivot) within the region surrounded by the belt of the belt converter whereby the position of the idle shaft moves to finely adjust the stretching of the chain. At this time, a fine change of the distance between shafts of the drive pulley and driven pulley of the belt converter can be disregarded.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

PREFERRED EMBODIMENTS OF THE INVENTION

Figure 1:
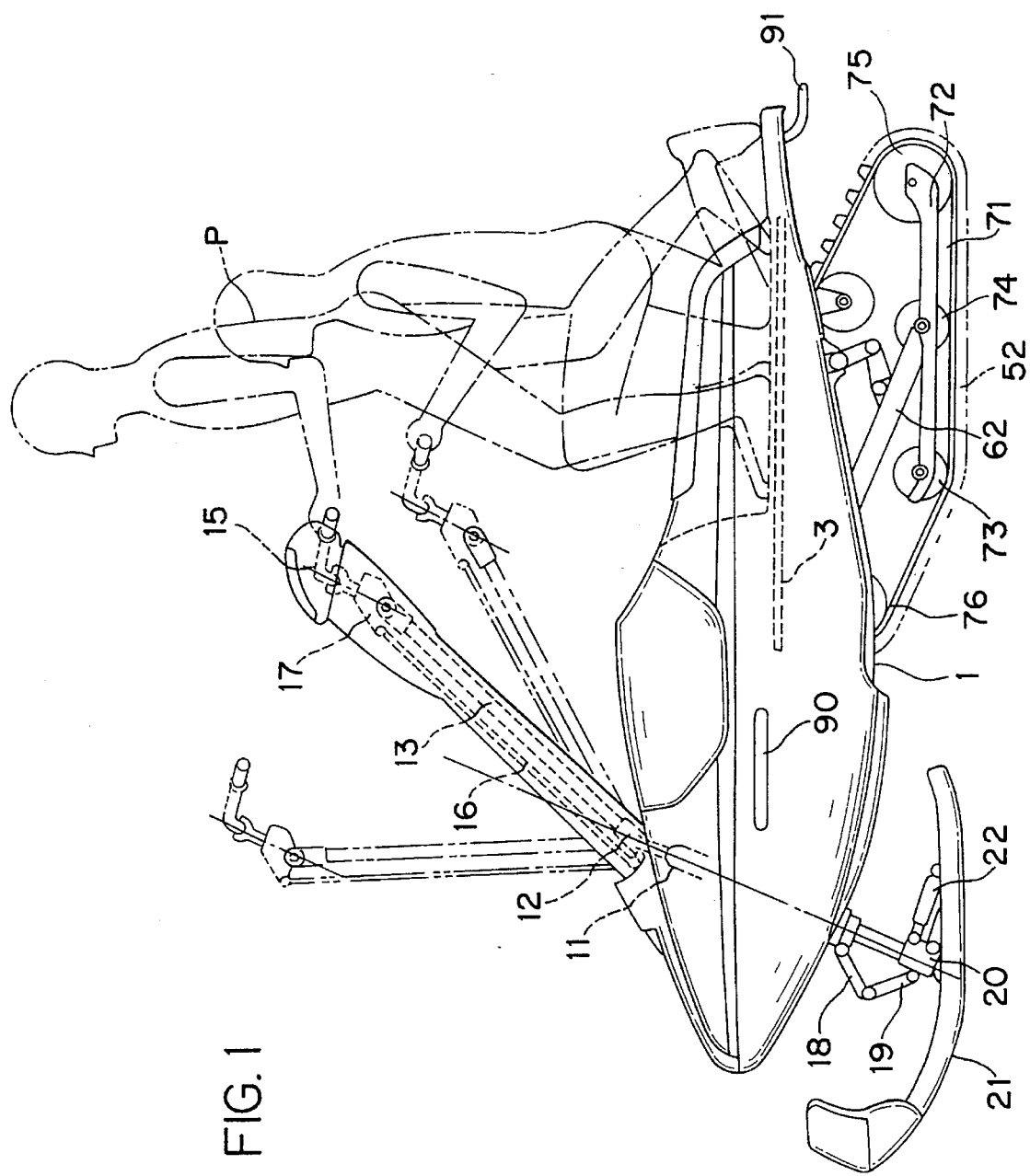
FIG. 1 is a side view of the entire snowmobile to which is applied a suspension device according to the present invention.
Figure 2:
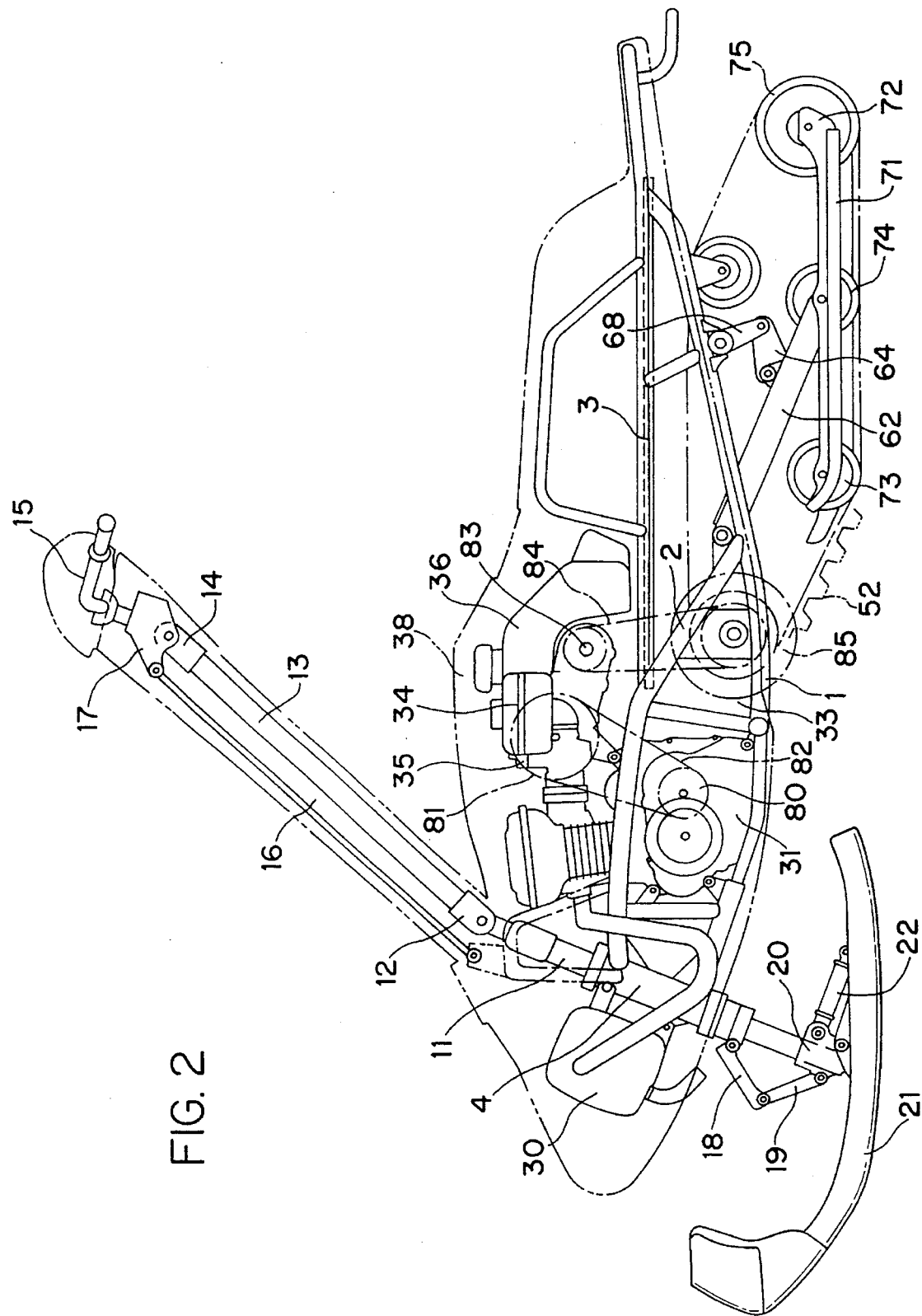
FIG. 2 is a perspective view showing inside a body cover of the snowmobile.

The embodiment of the 1 present invention will be described hereinbelow with reference to the accompanying drawings. Turning to FIGS. 1 and 2, side views of the entire snowmobile having a suspension device according to the present invention are shown. In the snowmobile, an upper frame 2 is provided at the front portion of a main frame 1 comprised of a pipe. A floor 3 is provided between the rear portion of the upper frame 2 and the rear end of the main frame 1, and a head pipe 4 is mounted on front ends of the main frame 1 and the upper frame 2.

A lower member 11 of a steering post is inserted into the head pipe 4. An upper member 13 of a steering post is connected to the upper end of the lower member 11 through 10 a universal joint 12. A handlebar 15 is connected to the upper end of the upper member 13 through a universal joint 14. A steering link 16 having a lower end supported on the snowmobile body and provided swingingly within the vertical surface is arranged forwardly of and parallel with the upper member 13. A bracket 17 of the handlebar 15 is connected to the upper end of the steering link 16, the upper member 13 of the steering post, the handlebar 15 and the steering link 16 constituting a parallel link mechanism, so that even when a position of the handlebar 15 is moved up and down according to the riding position of the driver P, an angle of inclination of the handlebar 15 is constantly maintained.

A front ski 21 for steering the snowmobile is mounted on the lower end of the lower member 11 of the steering post through links 18, 19 and a bracket 20. The attitude of the front ski 21 is returned to its straight direction by means of an urging member 22.

Figure 3:
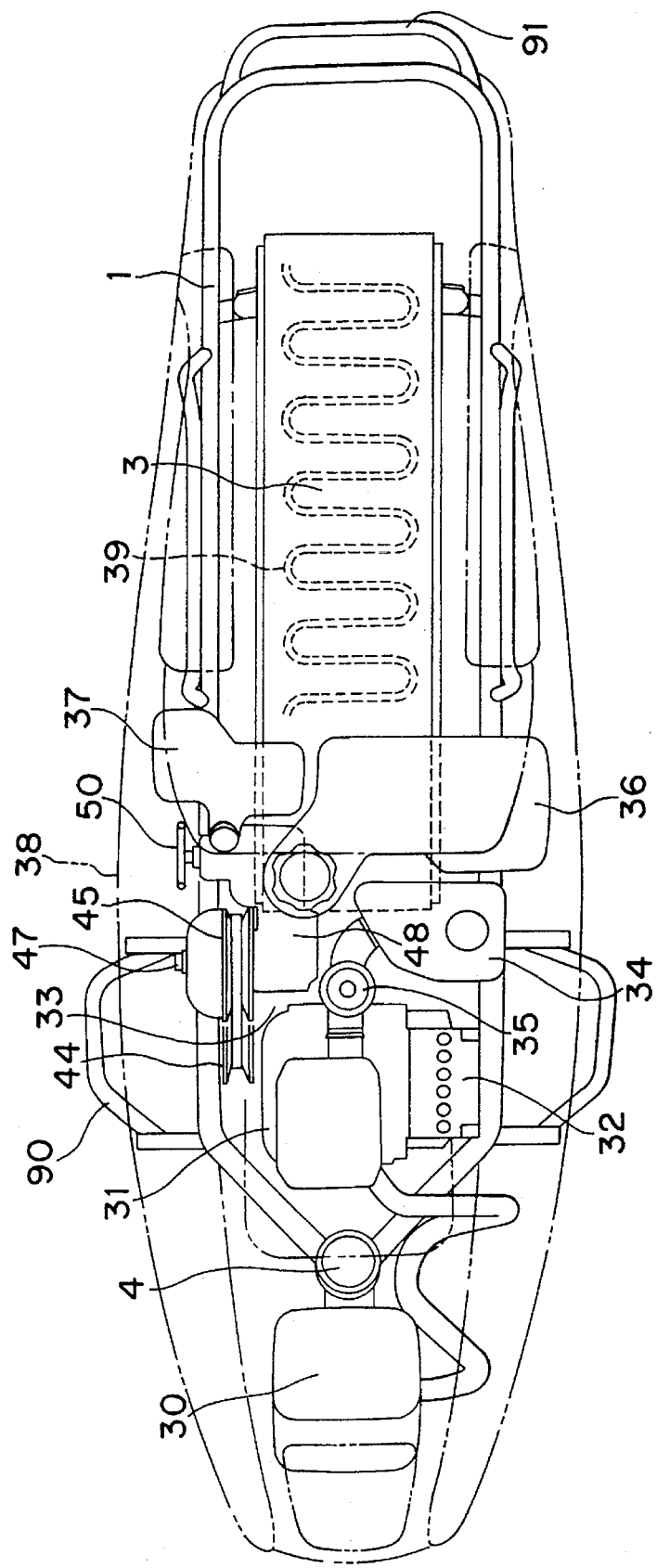
FIG. 3 is a plan view of the snowmobile.

As seen in FIGS. 2 and 3, a muffler 30 is mounted on the front side of the head pipe 4. An engine 31 is mounted on the mainframe 1 at the rear of the head pipe 4. A battery 32, a transmission case 33, an air cleaner 34, a carburetor 35, a fuel tank 36 and a radiator reservoir tank 37 are arranged sideways at the rear of the engine 31 and upwardly at the rear of the transmission case 33, respectively. A body cover 38 covers all these members.

Further, a radiator pipe 39 in communication with the radiator reservoir tank 37 is arranged as a whole below a panel of the floor 3 so as to heat the feet of the driver P. Moreover, a grip portion 90 projects from both sides of the body cover 38, and a grip portion 91 is also provided at the rear of the floor 3.

Figure 4:
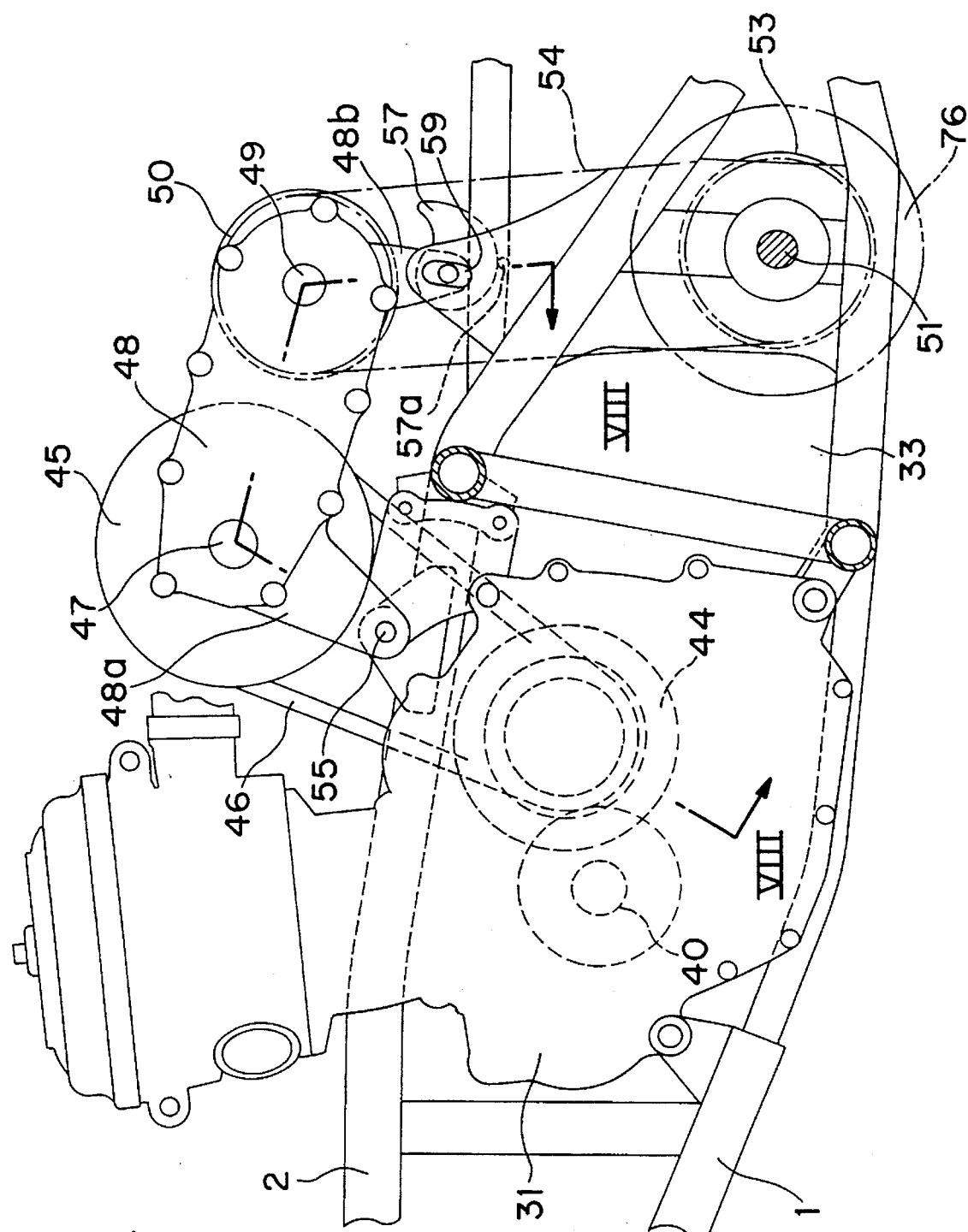
FIG. 4 is an enlarged side view of the driving device of the snowmobile.
Figure 5:
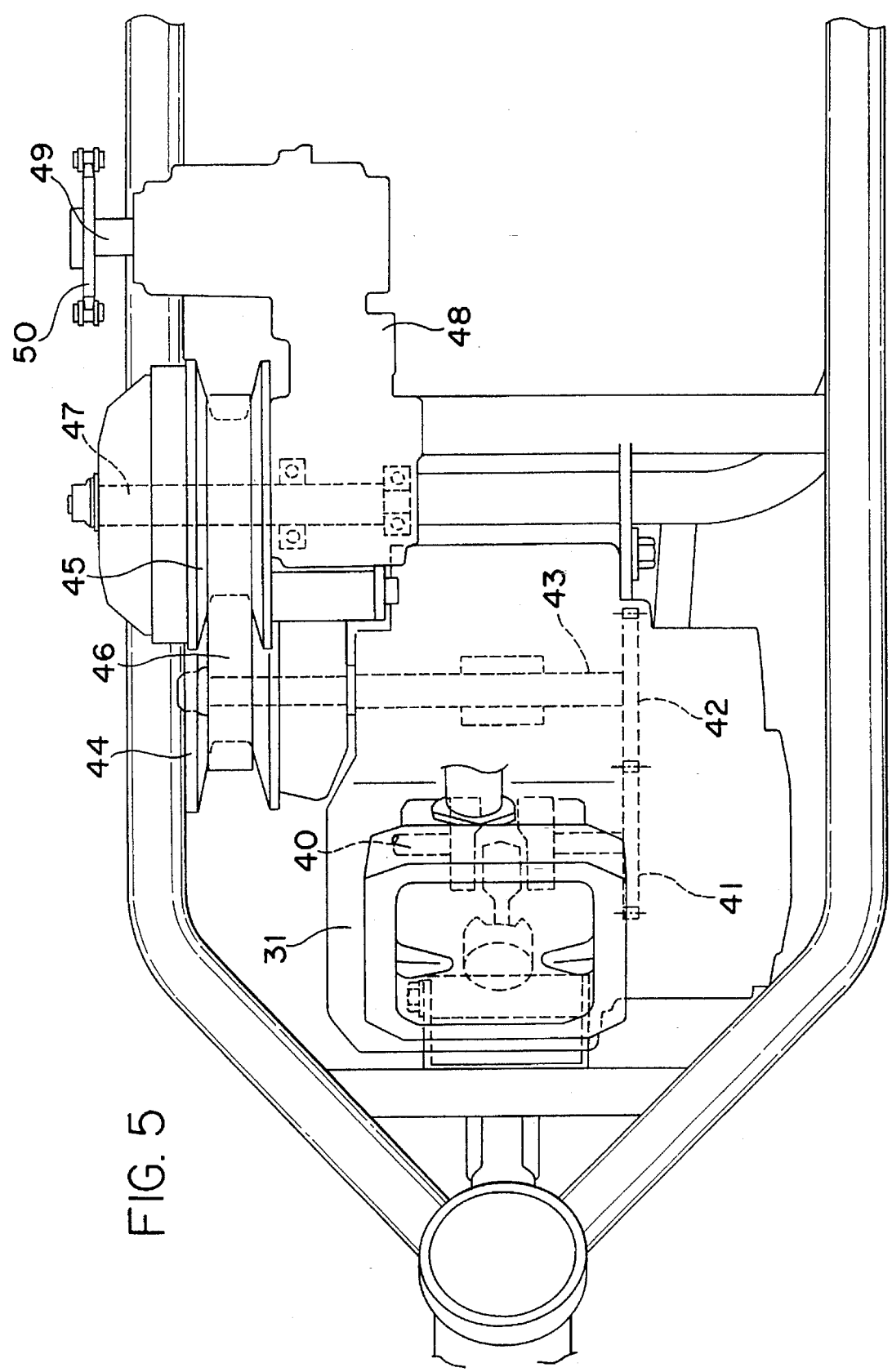
FIG. 5 is an enlarged plan view of the driving device of the snowmobile.

The main structure of the driving device will be described below with reference to FIGS. 4 and 5. A crank shaft 40 of the engine 31 is connected to an output shaft 43 of the transmission case 33 through gears 41 and 42. A drive pulley 44 of a belt converter is mounted on the output shaft 43. A driven pulley 45 of the belt converter is arranged above the drive pulley 44, and a belt 46 is stretched between the drive pulley 44 and the driven pulley 45.

A shaft 47 of the driven pulley 45 is rotatably supported on a gear case 48. An idle shaft 49 is supported on the other end of the gear case 48, and a drive sprocket 50 is secured to the idle shaft 49. A driven sprocket 53 for causing a crawler belt 52 to run is secured to a shaft 51 mounted on the frame, and a chain 54 is stretched between the sprockets 50 and 53.

The gear case 48 is provided with lever portions 48a, 48b. One lever portion 48a is fastened with the engine through a gear case pivot 55. The other lever portion 48b is fastened with a bracket 56 provided on the upper frame 2 through a chain adjuster 57.

Figure 9:
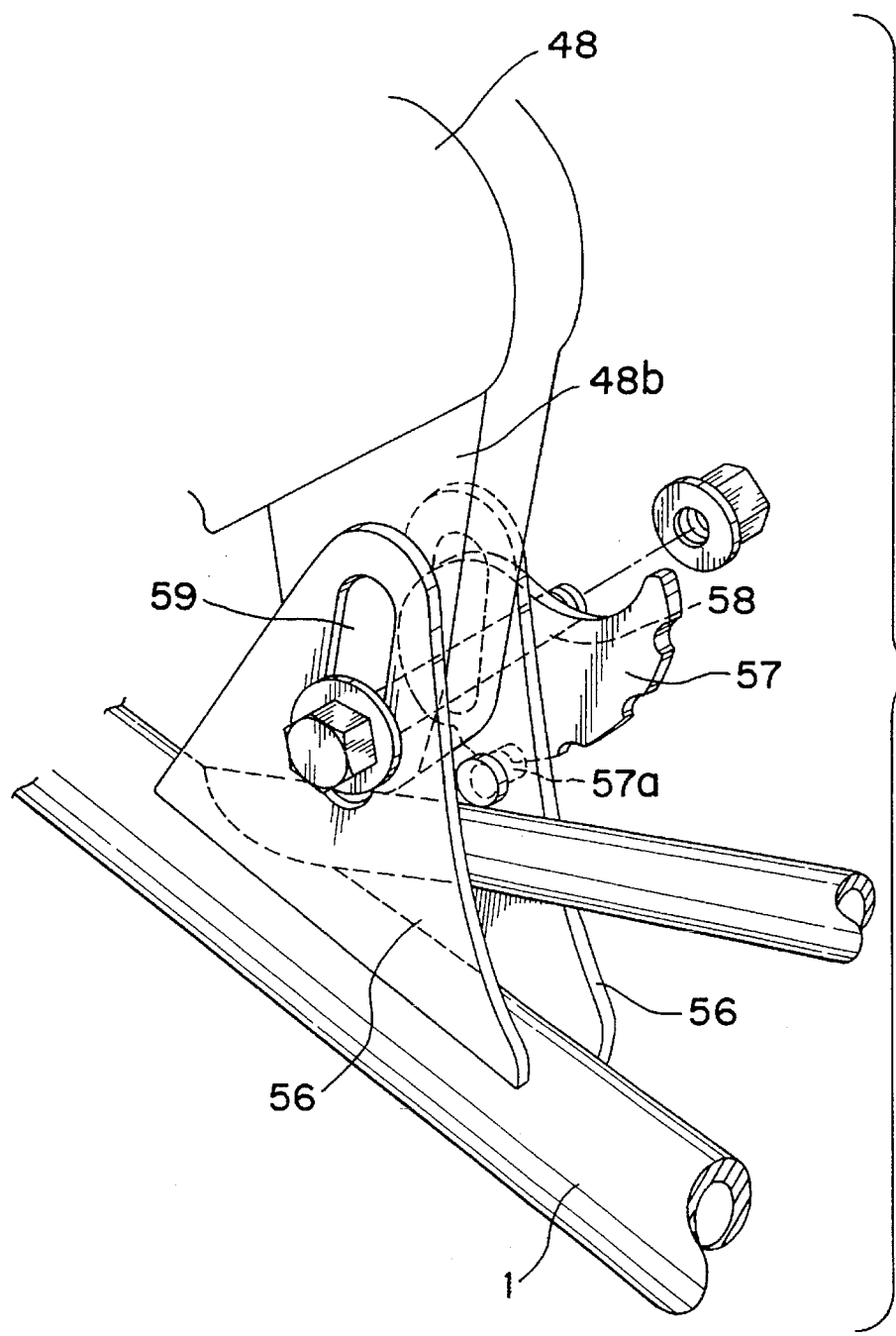
FIG. 9 is a perspective view showing the adjuster and members in the periphery thereof.
Figure 10:
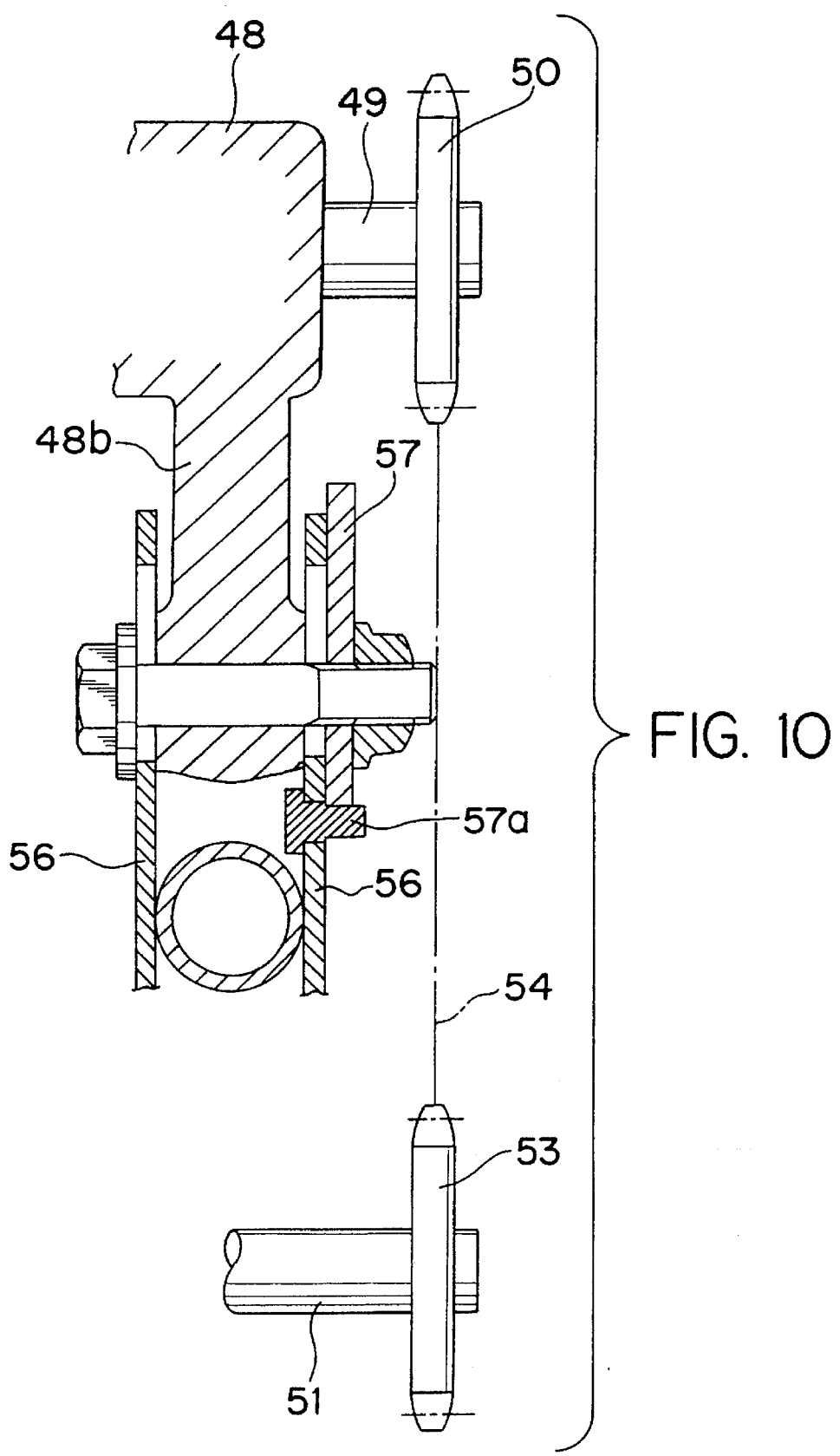
FIG. 10 is a longitudinal sectional view showing the adjuster and members in the periphery thereof.

As seen in FIG. 9, the chain adjuster 57 has a cam surface and has a rotational shaft 58 held in a slot 59 of the bracket 56. The chain adjuster 57 is loosened and is rotated through a predetermined angle while placing the cam surface of the chain adjuster 57 in contact with a stopper 57a. Then, the gear case 48 rotates around the gear case pivot 55 so that the idle shaft 49 moves to finely adjust the stretching of the chain 54.

Due to the above adjustment, the shaft 47 of the driven pulley 45 also moves but since the gear case pivot 55 is positioned within the region surrounded by the belt 46, a distance between shafts of the drive pulley 44 and the driven pulley 45 rarely changes.

Figure 6:
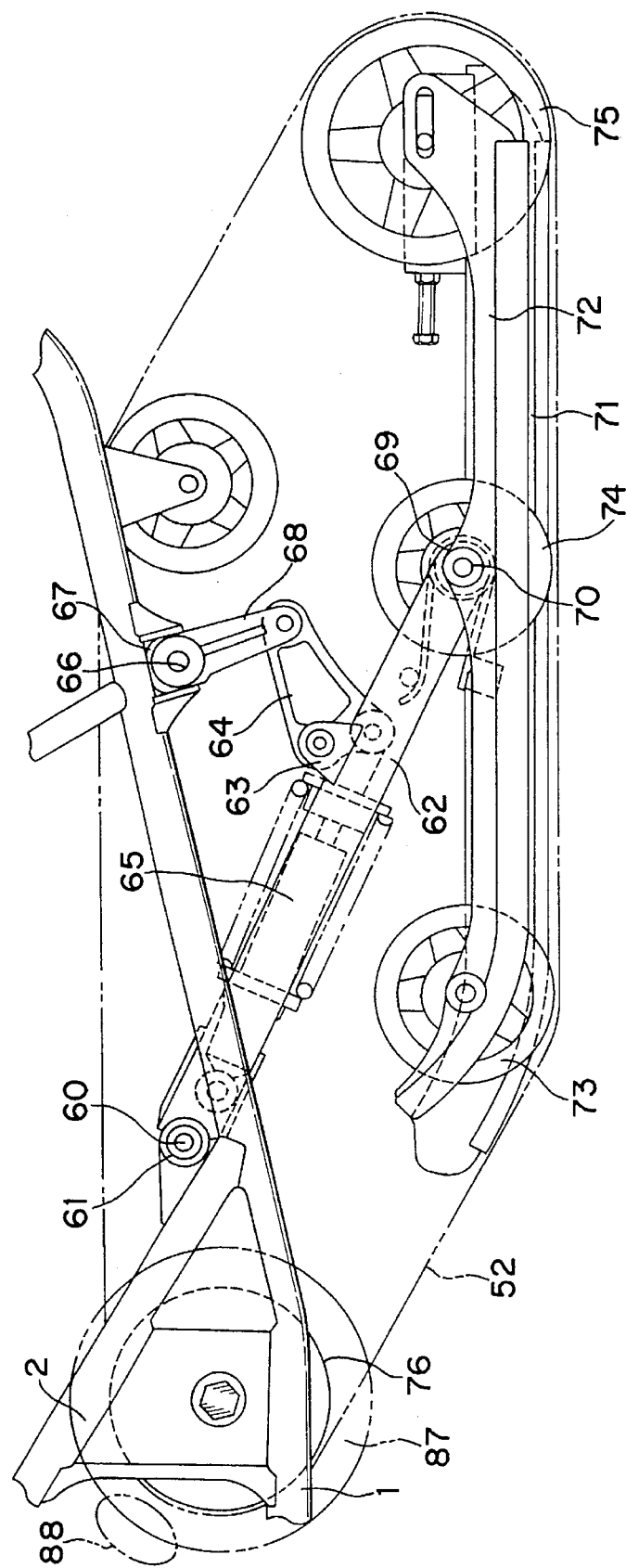
FIG. 6 is a side view showing the suspension device of the snowmobile and the periphery thereof.
Figure 7:
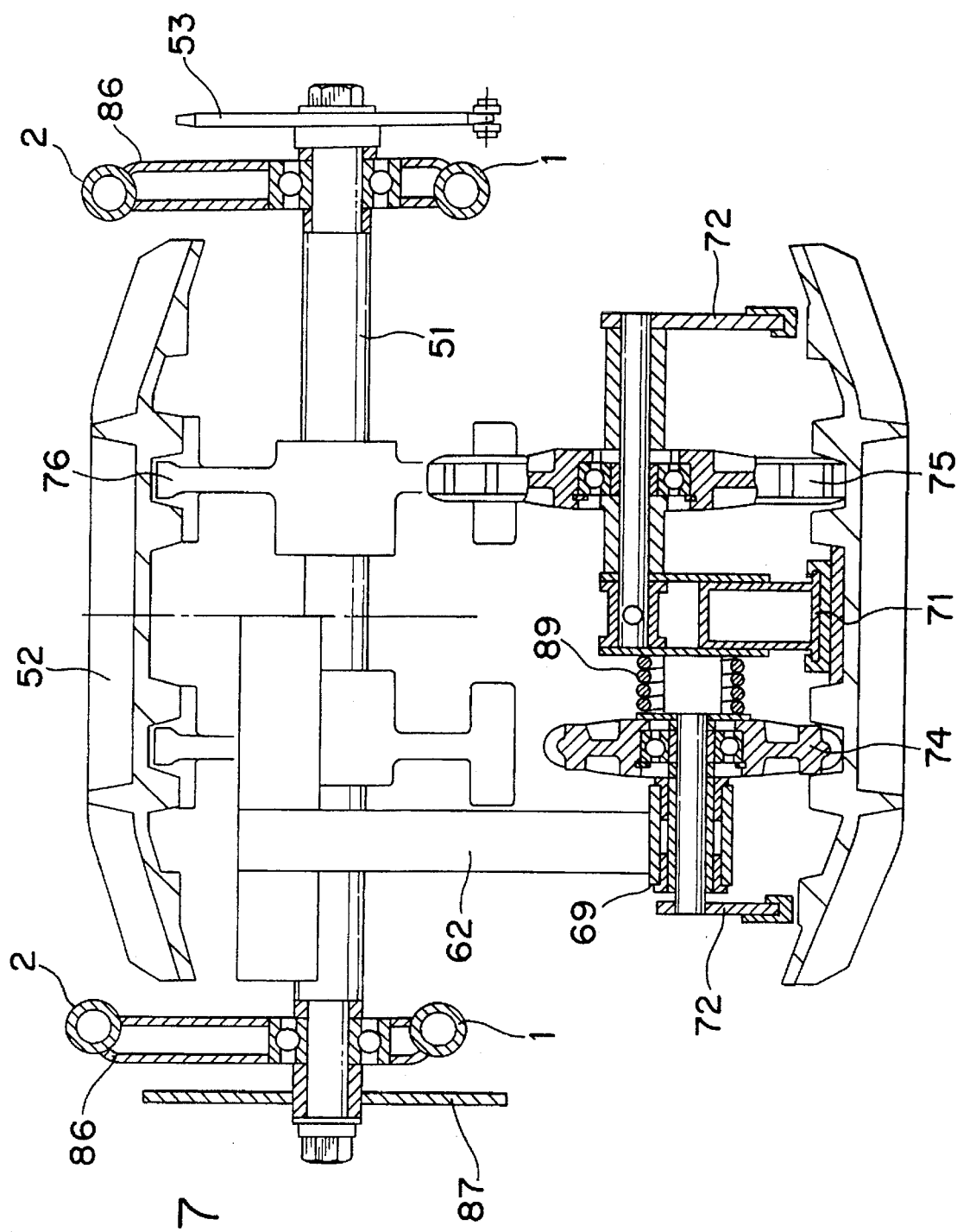
FIG. 7 (right side) is a view taken along B1 of FIG. 6, FIG. 7 (left side) being a view taken along B2 thereof.
Figure 8:
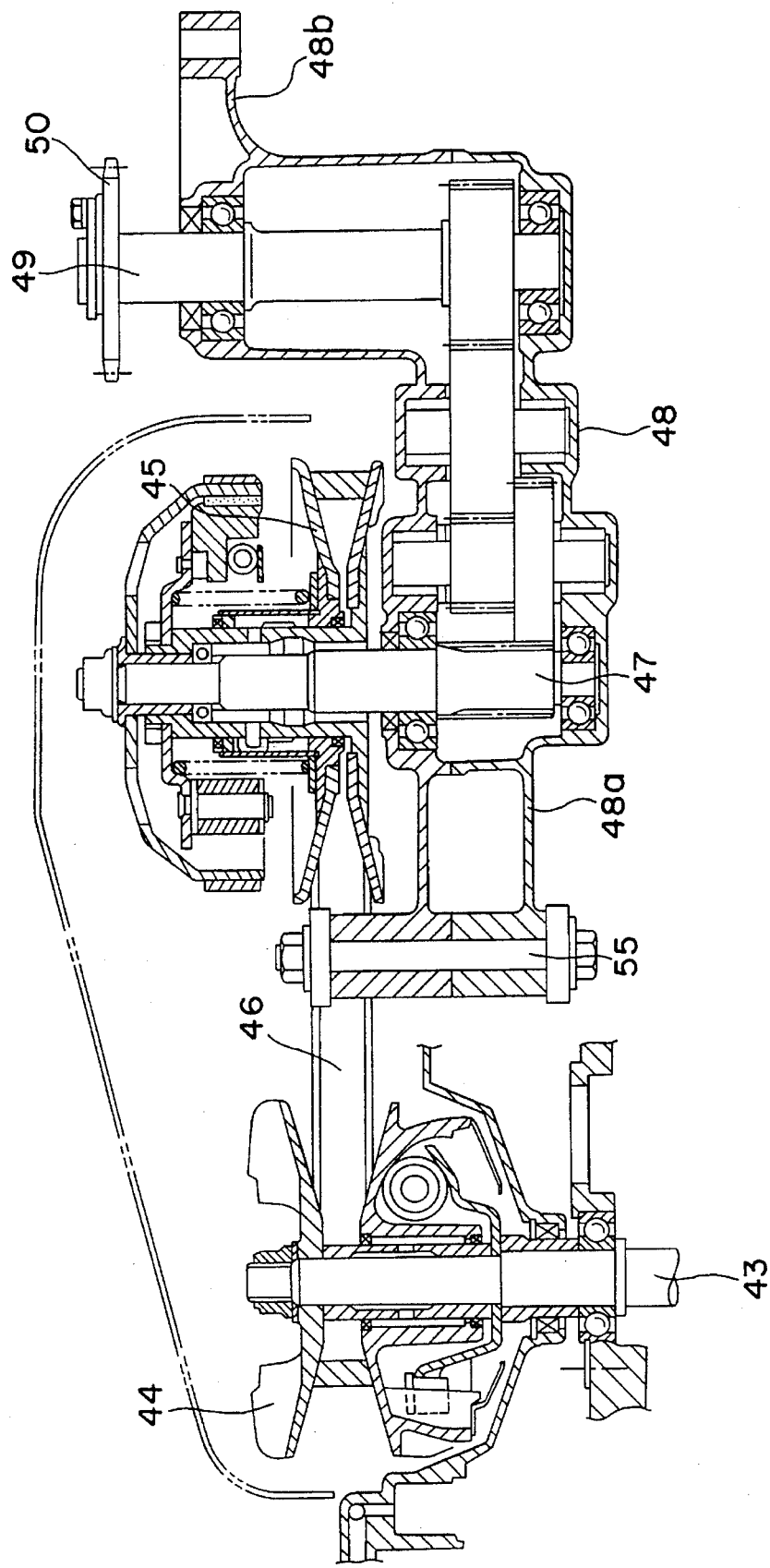
FIG. 8 is a plan sectional view taken on VIII—VIII of FIG. 4.

Gusset plates 86, 86 are provided in the vicinity of a crossing portion between the main frame 1 and the upper frame 2, as shown in FIGS. 6 and 7. The driving shaft 51 is rotatably supported between the gusset plates 86, 86. The sprocket 53 is secured to one end of the driving shaft 51. A brake disk 87 is secured to the end of the driving shaft 51 on the side opposite to the sprocket 53, and a brake caliper 88 is provided, as shown in FIG. 6, in the vicinity of the brake disk 87. A driving wheel 76 is mounted by spline fitting or the like in the intermediate portion of the driving shaft 51, and a gear portion formed in the outer periphery of the driving wheel 76 is brought into engagement with a rugged portion formed in the inner surface of the crawler belt 52.

In the suspension device, a cross pipe 61 is rotatably supported on a shaft 60 mounted in the intermediate portion between the left and right main frames 1, 1. Front ends of a pair of left and right swing arms 62, 62 are swingingly supported on the cross pipe 61. A shaft 63 is mounted in the intermediate portion between the pair of swing arms 62, 62, and a triangular link 64 is rotatably supported on the shaft 63.

The front end of a rear cushion unit 65 is connected to the center of the cross pipe 61 between the front ends of the pair of left and right swing arms 62, 62, the rear end thereof being connected to one corner portion of the triangular link 64. A shaft 66 is mounted in the intermediate portion between the left and right main frames 1, 1. A cross pipe 67 is rotatably supported on the shaft 66. An upper end of a link 68 is mounted on the cross pipe 67, and the lower end of the link 68 is connected to the other corner portion of the triangular link 64.

On the other hand, a collar 69 is provided on the rear end of the swing arm 62. A shaft 70 is rotatably mounted in the collar 69. A main slide rail 71 laterally extended is mounted in the central portion of the shaft 70. A pair of left and right side slide rail 72 are mounted on the outer end of the shaft 70, and guide wheels 73, 74 and 75 are rotatably supported between the front ends, intermediate portions and rear ends of the main slide rail 71 and the side slide rail 72. The front end of the main slide rail 71 is urged downwardly by a spring 89.

With the above-described arrangement, when the engine 31 is driven, this drive is transmitted to the drive pulley 80 of the belt converter, as shown in FIG. 2. The drive pulley 81 is rotated through the belt 82 stretched between the drive pulley 80 and the driven pulley 81. The rotation of the driven pulley 81 is transmitted to the idle shaft 83. The rotation of the idle shaft 83 is transmitted to the driving wheel 76 which is then rotated through the chain 84 and the driving sprocket 53, and the crawler belt 52 is moved by the rotation of the driving wheel 76 so that the snowmobile runs.

As described above, according to the present invention, there is provided a driving device for a snowmobile, in which an output of an engine is transmitted to an idle shaft through a belt converter and a chain is stretched between a sprocket secured to the idle shaft and a sprocket secured to a drive shaft of a crawler belt, the idle shaft being adjusted in position around an axis (gear case pivot) within the region surrounded by the belt of the belt converter, whereby a change in distance of the axis of the belt converter can be finely adjusted. Accordingly, the stretching of the chain can be adjusted without making adjustment of the axis of the belt converter, and in addition, the adjustment is very easy.

Further, since the pivot pin of the gear case is positioned internally of the region surrounded by the belt of the belt converter, the whole system is compact. Particularly, if the gear case is fastened with the engine, the variation in distance between shafts can be minimized in fabrication thereof.

Moreover, since the adjuster according to the present invention does not contact the chain, friction does not increase and wear is not produced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A driving device for a snowmobile comprising:

an engine;

an idle shaft having a sprocket secured thereto;

a belt converter for transmitting an output of the engine to the idle shaft;

a crawler belt having a drive shaft, the drive shaft being in a fixed position relative to the engine;

a chain stretched between the sprocket secured to the idle shaft and a sprocket secured to the drive shaft of the crawler belt; and an adjuster for adjusting in position said idle shaft around an axis within a region surrounded by a belt of said belt converter, the idle shaft and sprocket being movable away from the drive shaft of the crawler belt by the adjuster to thereby increase tension in the chain.

2. The driving device for a snowmobile according to claim 1, further comprising a gear case provided between a driven pulley of said belt converter and said idle shaft, said gear case being adjustable in position around an axis within a region surrounded by said belt of said belt converter by said adjuster.

3. The driving device for a snowmobile according to claim 1, further comprising a gear case, the idle shaft being mounted on the gear case and the gear case being pivotally mounted on the engine, the idle shaft being moved during pivoting of the gear case.

4. The driving device for a snowmobile according to claim 3, further comprising at least one bracket and a stopper, the stopper being provided on the at least one bracket, the adjuster having a cam surface engageable with the stopper, the cam surface being moved along the stopper during pivoting of the gear case.

5. The driving device for a snowmobile according to claim 4, wherein two brackets are provided as the at least one bracket, both of the brackets being mounted adjacent one another, each bracket having a slot provided therein and the driving device further comprising a rotational shaft extending through each of the slots of the brackets, the adjuster being mounted on the rotational shaft, the adjuster having a plurality of detents for engaging the stopper.

6. The driving device for a snowmobile according to claim 3, wherein the chain extending between the sprocket secured to the idle shaft and a sprocket secured to the drive shaft of the crawler belt is tensioned by pivoting of the gear case.

7. The driving device for a snowmobile according to claim 3, further comprising a bracket, the gear case having a first and second lever portion, the first lever portion being pivotally mounted to the engine by a gear case pivot and the second lever portion being fastened to the bracket, the adjuster being located between the second lever portion and the bracket.

8. A driving device for a snowmobile having a crawler belt, the driving device comprising:

an engine;

a transmission case connected to the engine;

a belt converter connected to the transmission case, the belt converter having a drive pulley and a driven pulley, the drive pulley being connected to the transmission case;

a gear case, a shaft of the driven pulley of the belt converter being rotatably supported on the gear case;

an idle shaft supported on the gear case;

a drive sprocket connected to the idle shaft, the drive sprocket moving the crawler belt, the engine driving the drive sprocket through the transmission case, the belt converter, the gear case and the idle shaft; and an adjuster for pivoting the gear case without disconnecting the connection between the idle shaft and the drive sprocket and without disconnecting a connection between the driven pulley and the drive pulley of the belt converter.

9. The driving device for a snowmobile according to claim 8, wherein said gear case is adjustable by the adjuster in position around an axis within a region surrounded by a belt of said belt converter.

10. The driving device for a snowmobile according to claim 8, wherein the gear case is pivotally mounted on the engine, the idle shaft being moved during pivoting of the gear case.

11. The driving device for a snowmobile according to claim 10, further comprising at least one bracket and a stopper, the and the stopper being provided on the at least one bracket, the adjuster having a cam surface engageable with the stopper, the cam surface being moved along the stopper during pivoting of the gear case.

12. The driving device for a snowmobile according to claim 11, wherein two brackets are provided as the at least one bracket, both of the brackets being mounted adjacent one another, each bracket having a slot provided therein and the driving device further comprising a rotational shaft extending through each of the slots of the brackets, the adjuster being mounted on the rotational shaft, the adjuster having a plurality of detents for engaging the stopper.

13. The driving device for a snowmobile according to claim 10, further comprising a chain stretched between the drive sprocket secured to the idle shaft and a sprocket secured to a drive shaft for the crawler belt, the chain being tensioned by pivoting of the gear case.

14. The driving device for a snowmobile according to claim 10, further comprising a bracket, the gear case having a first and second lever portion, the first lever portion being pivotally mounted to the engine by a gear case pivot and the second lever portion being fastened to the bracket, the adjuster being located between the second lever portion and the bracket.

15. A driving device for a snowmobile comprising:

an idle shaft having a drive sprocket secured thereto;

a crawler belt having a drive shaft;

a chain stretched between the drive sprocket secured to the idle shaft and a sprocket secured to the drive shaft of the crawler belt; and an adjuster for pivoting in position said idle shaft around an axis without removing the chain from the drive sprocket, the idle shaft and drive sprocket being movable by the adjuster toward and away from the drive shaft of the crawler belt to adjust tension in the chain.

16. The driving device for a snowmobile according to claim 15, further comprising a gear case and a driven pulley of a belt converter, the gear case being provided between a driven pulley of said belt converter and said idle shaft, said gear case being pivotable in position around an axis within a region surrounded by a belt of said belt converter by said adjuster.

17. The driving device for a snowmobile according to claim 16, further comprising at least one bracket and a stopper, the stopper being provided on the at least one bracket, the adjuster having a cam surface engageable with the stopper, the cam surface being moved along the stopper during pivoting of the gear case.

18. The driving device for a snowmobile according to claim 17, wherein two brackets are provided as the at least one bracket, both of the brackets being mounted adjacent one another, each bracket having a slot provided therein and the driving device further comprising a rotational shaft extending through each of the slots of the brackets, the adjuster being mounted on the rotational shaft, the adjuster having a plurality of detents for engaging the stopper.

19. The driving device for a snowmobile according to claim 16, wherein the chain extending between the sprocket secured to the idle shaft and a sprocket secured to the drive shaft of the crawler belt is tensioned by pivoting of the gear case.

20. The driving device for a snowmobile according to claim 16, further comprising a bracket and an engine operatively connected to the idle shaft, the gear case having a first and second lever portion, the first lever portion being pivotally mounted to the engine by a gear case pivot and the second lever portion being fastened to the bracket, the adjuster being located between the second lever portion and the bracket.

* * * * *